US006562398B1

(12) United States Patent
Braach-Maksvytis et al.

(10) Patent No.: US 6,562,398 B1
(45) Date of Patent: May 13, 2003

(54) MOLECULAR COATINGS

(75) Inventors: Vijoleta Braach-Maksvytis, New South Wales (AU); Burkhard Raguse, New South Wales (AU)

(73) Assignee: Commonwealth Scientific and Industrial Research Organization, Campbell (AU)

( * ) Notice: Subject to any disclaimer, the term of this patent is extended or adjusted under 35 U.S.C. 154(b) by 0 days.

(21) Appl. No.: 09/701,365

(22) PCT Filed: May 27, 1999

(86) PCT No.: PCT/AU99/00413

§ 371 (c)(1),
(2), (4) Date: Jan. 26, 2001

(87) PCT Pub. No.: WO99/61531

PCT Pub. Date: Dec. 2, 1999

(30) Foreign Application Priority Data

May 27, 1998 (AU) .............................................. PP 3736

(51) Int. Cl.$^7$ ................................................. B05D 5/12

(52) U.S. Cl. ......................................................... 427/58

(58) Field of Search ................................ 427/58, 430.1; 428/1, 1.1, 1.6

(56) References Cited

U.S. PATENT DOCUMENTS

| | | | |
|---|---|---|---|
| 5,246,747 A | * | 9/1993 | Gillberg-LaForce et al. ... 428/1 |
| 5,251,197 A | * | 10/1993 | Leube et al. ................. 369/110 |
| 5,686,549 A | * | 11/1997 | Grainger et al. ............... 528/25 |
| 5,702,777 A | | 12/1997 | Rosch et al. ..................... 428/1 |
| 5,897,918 A | * | 4/1999 | Singh et al. ................. 427/352 |
| 6,106,743 A | * | 8/2000 | Fan ............................ 252/582 |
| 6,284,267 B1 | * | 9/2001 | Aneja .......................... 424/450 |
| 6,342,934 B1 | * | 1/2002 | Kameyama et al. .......... 349/98 |

FOREIGN PATENT DOCUMENTS

| | | |
|---|---|---|
| GB | 2 194 785 | 3/1988 |
| WO | WO 97/03824 | 2/1997 |

OTHER PUBLICATIONS

J. F. Rusling et al., "Spectroscopy and Molecular Modeling of Electrochemically Active Films of Myoglobin and Didodecyldimethylammonium Bromide", American Chemical Society, 1994, pp. 250–268, Molecular Modeling, vol. 576.

M. Woolley et al., "Ultrathin Films of Smectic Liquid Crystals on Solid Substrates", American Chemical Society, 1995, pp. 683–686, Langmuir, vol. 11.

V. V. Tsukruk, et al., "Morphology and Molecular Ordering of Langmuir–Blodgett and Self–Organized Films from Organic Compounds", Atomic Force Microscopy/Scanning Tunneling Microscopy, 1994, pp. 381–391.

P. Xie, et al., "Functionalization and Application of Ladder–like Polysilsesquioxanes", Polymers for Advance Technologies, 1997, pp. 649–565, vol. 8.

R. Maoz, et al., "Self–assembling Monolayers in the Construction of Planned Supramolecular Structures and as Modifiers of Surface Properties", Journal de Chimie Physique, 1988, 85, No. 11/12 pp. 1059–1065.

Y. Xia, et al., "Pattern transfer: Self–assembled monolyers as ultrathin resists"Microelectronic Engineering 32 (1996) pp. 255–268.

* cited by examiner

*Primary Examiner*—Michael Barr
(74) *Attorney, Agent, or Firm*—Christie, Parker & Hale, LLP

(57) ABSTRACT

A method of ionically and/or electrically insulating a surface of a material is provided. The method comprises attaching to the surface a self-assembling monolayer membrane. The membrane comprises self-assembling molecules that comprise hydrocarbon chains having a length of 3 to 60 carbons. The self-assembling molecules are selected such that the membrane is liquid crystalline.

8 Claims, 14 Drawing Sheets

(A)

(B)

MOLECULAR COATINGS

Field of the Invention

This invention relates broadly to molecular coatings or articles to, for example, protect surface of the article or to alter the surface characteristics such as its hydrophilicity or hydrophobicity.

Background of the Invention

The field of surface science has gained increasing technological importance over recent-decades due to the ongoing reduction in dimensions of e.g. integrated circuits, micromechanical machines and sensors. Therefore, surface properties become increasingly important as many of the characteristics of such devices are determined ultimately by processes that occur at surfaces of or interfaces between thin coatings of the relevant materials. As such, for example the control of the surface properties of the outermost surfaces (i.e. at the device to environment interface) are critical in designing such devices. Surface coatings therefore play an important role in thin film device technology. As part of this technology the characteristics of monolayer films/coatings on a variety of surfaces have been extensively researched. One class of monolayers is referred to as self-assembling monolayers (SAMs) which are organised monolayers that can be prepared via spontaneous adsorption from neat or dilute solution. An overview of self-assembling monolayers can be found in "Self-assembling Monolayers in the Construction of Planned Supramolecular Structures and as Modifiers of Surface Properties", R. Maoz et al., Journal de Chimie Physique, 1988, 85, No. 11/12 1059-1065, and "Pattern transfer: Self-assembled monolayers as ultrathin resists", Y. Xia et al., Microelectronic Engineering 32 (1996) 255–268. In the former document it is described that surface-bound monolayers prepared by self-assembly may be used to modify the chemical nature of a substrate surface in two different ways, a) that the monolayer forming molecules are oriented on the surface with the desired functional group pointing outwards or b) that the desired functional group is introduced via in situ chemical modification of the pre-assembled SAMs.

It has been one of the main criteria of self-assembled monolayers to produce a close packed, highly oriented array of long chain hydrocarbon molecules on a substrate, the long chain hydrocarbon molecules embedded between a bottom functional group that can be used to attach the molecule to a substrate and a top, surface functional group that may be used to alter the surface characteristics. The structure of the SAM molecules determine the permeability characteristics and/or stability characteristics of the SAM. Up to date it has been believed that in order to optimise the properties/usefulness of SAMs it is desired to increase the crystallinity of the SAMs in order to provide stable ordered, close packed, two-dimensional arrangements of the surface groups. To utilise the (for example) protective or insulating properties of a SAM most effectively, it was believed to be necessary to minimise the defects in the SAMs (i.e. to increase their crystallinity) to take full advantage of the properties attributable to a "pure" SAM. However, the defect free properties of the SAM will ultimately be influenced by the surface on which the SAMs are formed. Most surfaces comprise defects such as monoatomic steps, kinks or facets which may transfer defects to the SAM formed on those surfaces. Therefore, the attempt to improve the SAM properties/applications by increasing their crystallinity has a preset limit forced onto the SAM by the substrate. In particular in more commercially oriented applications of SAMs, this limit constitutes a significant draw back in the application of SAMs, as preparation of substrate surfaces with a negligible amount of surface defects on a large scale can be economically difficult if not impossible at this stage.

Apart from he applications of coatings described above, such coatings are also applicable to various other surfaces comprising surfaces of fabrics to make the fabrics water resistant/repellent. In such applications even more so than in the surface scientific applications any influence of the surface of the substrate on the performance of the coatings constitutes a major disadvantage, as fabrics are non-crystalline substrates.

SUMMARY OF THE INVENTION

In accordance with a first aspect of the present invention there is provided an article comprising a molecular coating which comprises a layer having a liquid crystalline phase property.

By "article" we mean an object which has at least one is other function in addition to carrying the molecular layer, i.e. the article has utility or is intended to have utility other than just supporting the layer, e.g. a utilitarian article. For example an "article" may comprise a fabric (which can be used to make clothing), electronic devices such as integrated circuits on silicon wafers, micromachines, sensors, membranes, etc.

A coating formed from molecules having a liquid crystalline phase property preferably results in a coating whose structural properties are to a large extent independent of the structural properties of the underlying substrate. This is useful where the coating is used to for example protect the underlying substrate, i.e. a continuous, undamaged coating is desirable. If the structural properties of the coating are strongly dependent on the structural properties/defects of the substrate (i.e. the coating is crystalline), the coating may exhibit cracks or discontinuities caused by those defects. As it is almost impossible to create substrates which are completely free of any defects, molecular coatings which are formed from molecules having the liquid crystalline phase property can preferably be used to form continuous coatings free of defects induced by the substrate. The applicants have found that molecular layers having the liquid-crystalline chase property show surprisingly good protective and insulating properties which were previously believed to be achievable only with crystalline molecular layers.

Preferably, the layer is a self-assembling layer. Self-assembling layers can be prepared via spontaneous absorption from organic solutions and can be used to modify the surface properties of a substrate or protect a substrate.

The self-assembling layers may be used to make the surface of a substrate more hydrophobic or hydrophilic, or to form a coating which has particular permeability characteristics and/or stability characteristics.

Advantageously, the molecules have a structure of

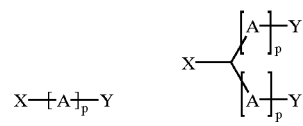

p = 1,2,3,4,5,6...20     p = 1,2,3,4,5,6...20

-continued

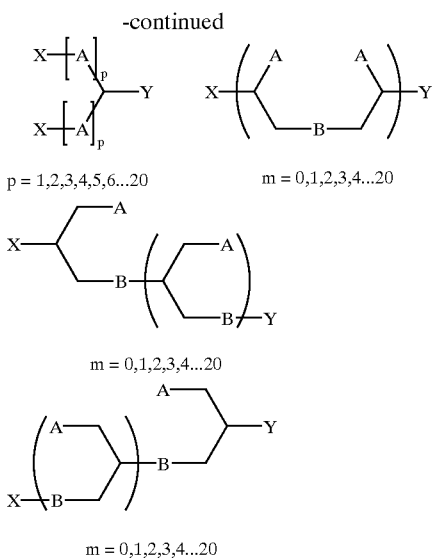

p = 1,2,3,4,5,6...20 m = 0,1,2,3,4...20 m = 0,1,2,3,4...20 m = 0,1,2,3,4...20 wherein group A are groups which confer the liquid-crystalline phase property on to the self-assembling layer, groups B are groups which confer structural stability onto the molecule, groups X are functional groups that are chosen so that the molecule can be attached to a surface, and groups Y are functional groups that are chosen to alter a property other than the liquid-crystalline phase property of the self-assembling layer.

In other embodiments, the molecules may have a structure of

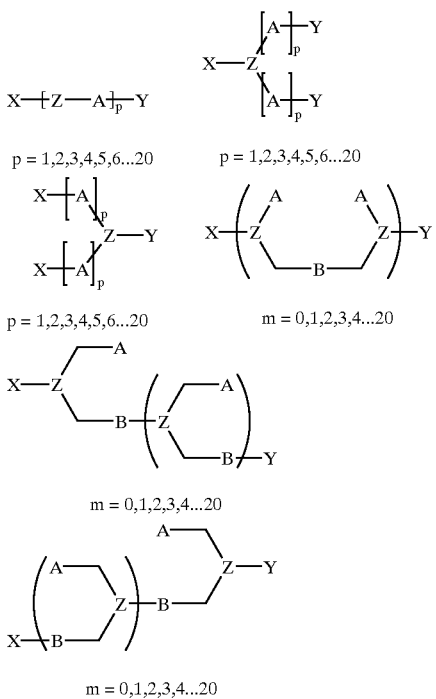

p = 1,2,3,4,5,6...20 p = 1,2,3,4,5,6...20 p = 1,2,3,4,5,6...20 m = 0,1,2,3,4...20 m = 0,1,2,3,4...20 m = 0,1,2,3,4...20 wherein groups A are groups which confer the liquid-crystalline phase property to the self-assembling layer, groups B are groups which confer structural stability onto the molecule, groups X are functional groups that are chosen so that the molecule can be attached to a surface, groups Y are functional groups that are chosen to alter a property other than the liquid-crystalline phase property of the self-assembling layer, and groups Z are functional groups that are chosen to join different groups within one molecule.

Advantageously, groups Z are functional groups that are further chosen to stabilise the self-assembling layer.

Preferably, groups B are further chosen to contribute to the liquid-crystalline phase property of the self-assembling layer.

The self-assembling layer may be a self-assembling monolayer.

The molecular coating may be a multi-layered coating comprising a layer having the liquid crystalline phase property. In other words, the molecular coating could be formed from more than one layer, at least one of which has the liquid-crystalline phase property.

The molecular coating may be a multi-layered coating comprising the self-assembling layer.

The molecular coating may be a self-assembling multi layer comprising the self-assembling layer.

In accordance with a second aspect of the present invention there is provided a method of coating an article comprising the step of coating the article with a molecular coating which comprises a layer having a liquid-crystalline phase property.

Note that in embodiments of the present invention the molecular coating need not cover the entire surface of the article, but may cover a portion only of the surface.

The present invention may be more fully understood from a description of preferred embodiments given below with reference to the accompanying drawings, by way of example only.

DETAILED DESCRIPTION OF THE PREFERRED EMBODIMENTS

Figure 1:
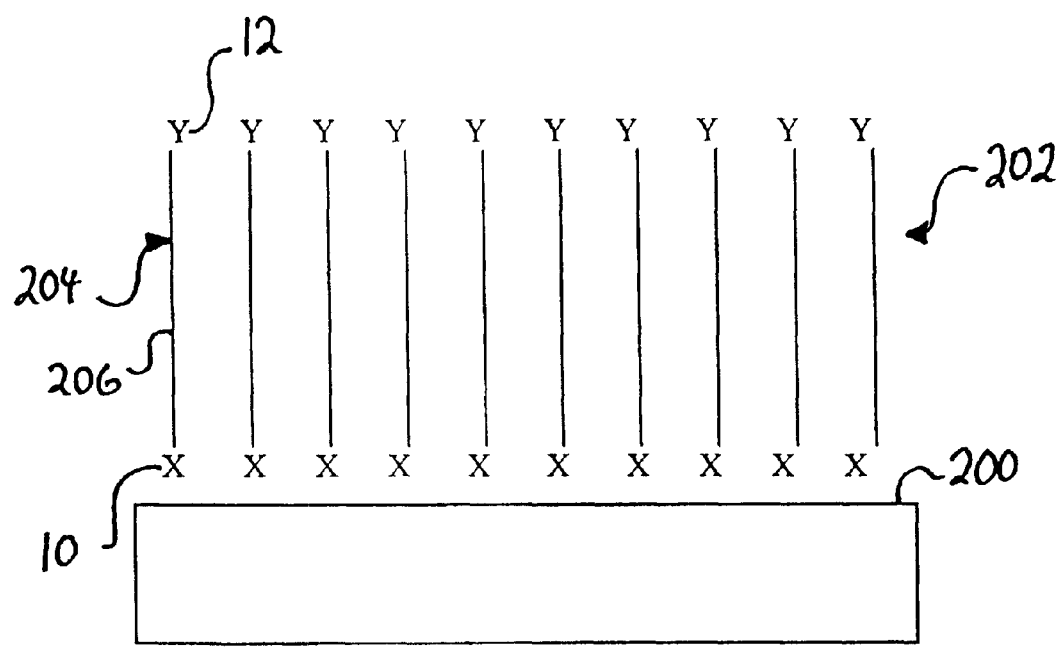
FIG. 1: is a schematic diagram of a coated semi-conductor in accordance with one embodiment of the present invention.
Figure 2:
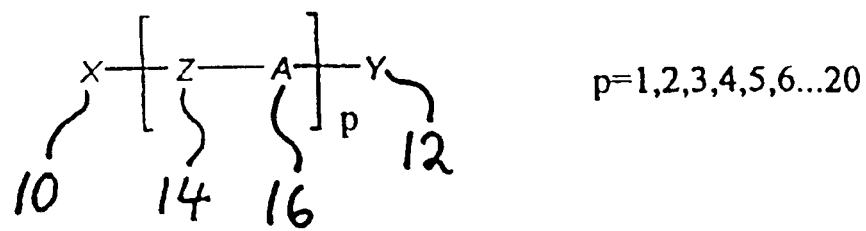
FIG. 2: is a generic structure of one molecule which forms a molecular layer which has a liquid-crystalline phase property.

In FIG. 1 a GaAs substrate 200 is covered by a molecular layer 202. The molecular layer 202 has a liquid crystalline property and is formed from molecules 204 which each consist of a functional group X 10 which is used to attach the molecule 204 onto the GaAs substrate 200, an organic/hydrocarbon chain 206 and a functional group Y 12 which terminates the molecule at its end away from the substrate. The GaAs substrate 200 may form part of a Schottky diode switch.

In FIGS. 2 to 7 the generic structures for molecules that can be used to create SAM's in a liquid crystalline phase are shown.

In FIGS. 2 to 7 X 10 is a functional group that can be used to attach the compound to a substrate. The nature of the group will depend on the nature of the substrate chosen in the particular application. For example, for a gold, palladium, platinum, copper or silver substrate X 10 is preferably a thiol (SH) or a disulfide (S—S) whereas for silica, glass, tin oxide, indium tin oxide, metal or oxidised polymer surfaces which have hydroxy functional groups on the surface, X 10 may preferably be a silicon chloride or silicon alkoxide group. For a gallium arsenide (GaAs) substrate (see example 1) X 10 may be a SH, or halogen such as bromine (Br), whereas for a ceramic high temperature superconductor (example 2) X 10 may be an amino or phosphonate group.

In FIGS. 2 to 7, Y 12 is the functional group which terminates the molecule at the end away from the substrate. Y 12 can be used to alter the surface characteristics of the coatings, the permeability and the stability of the SAM formed from the molecules on the substrate. If Y 12 is chosen to be a hydrocarbon group such as a methyl group. ($CH_3$), the surface of the SAM may be hydrophobic. If on the other hand Y 12 is a hydroxy group (HO) the surface of the SAM may be hydrophilic. Alternative end groups Y 12 to make the SAM hydrophilic comprise carboxylare, amino, amino acids, phosphatidylcholine, phosphatidylethanolamine, phosphate, phosphonate, polyethylene glycol, carbohydrates or other head groups found in either naturally occurring or synthetic lipids. In addition to its use to alter the surface characteristics, permeability and stability characteristics of the SAM, the head croup Y 12 can also be used to make the SAM receptive towards further in situ functionalisacion when it is formed on the substrate to for example in turn coat the SAM with additional material such as organic, ionic, metallic or polymeric coatings. Such additional coatings may be bonded via covalent or non-covalent interactions with the SAM and may be deposited through self-assembly, evaporation, electrodeposition, or various other deposition techniques depending on the additional coating chosen.

Group Z 14 is optional. It may be used to join groups such as A 16, B 18 or X 10 together. The group Z 14 may be derived from chemical structures such as glycerol, amino acids (for example glutamic acid or aspartic acid), trisubstituted aromatic hydrocarbons (for example benzene) or hydrocarbon groups.

In addition to joining groups within one molecule of the SAM, the group Z 14 can also be utilised to stabilise the SAM through bonding between groups Z of neighbouring molecules. If, for example, the group Z 14 is an aromatic group, those groups of neighbouring molecules can interact via $\pi$—$\pi$ bonding, whereas amino acid derived groups Z may interact via hydrogen bonding. In those two examples the bonding between the groups Z 14 of neighbouring molecules in the SAM form non-covalent bonds with each other. Covalent bonds between neighbouring groups Z 14 of the molecules in the SAM can be formed via polymerisable groups comprised in the groups Z 14. For example, inclusion of phosphonate groups allows formation of phosphonate/zirconium/phosphonate complexes between neighbouring groups Z 14.

Liquid Crystalline Phase Property of the SAM

In FIGS. 2 to 7 group A 16 is a hydrocarbon or other group used to confer the liquid-crystalline phase property onto the SAM.

The liquid-crystalline phase is a well defined term in the fields of both membrane (lipid) biophysics and in liquid-crystal display technology. The liquid-crystalline phase characterises a property of some molecules or molecular mixture aggregate to exhibit simultaneously "solid-like" and "liquid-like" characteristics. As an example, a SAM in accordance with an embodiment of the present invention is characterised by the "solid-like" property of ordering of the averaged azimuthal axis of the hydrocarbon chain with respect to the substrate surface and the "liquid-like" property of disorder in one or two dimensions. This contrasts with the SAM described in the prior art which tend to form crystalline phases which have both orientational and positional order and hence display properties akin to a solid only.

Group A 16 can be an unsaturated alkene or alkyne group, a phytanyl group or hydrocarbon derived from phytanol, a straight chain hydrocarbon that is mono or persubstituted with methyl groups, a straight chain hydrocarbon that incorporates five membered cyclic hydrocarbon structures, or it can be any of the group of structures that are found in the hydrocarbon chains of naturally occurring archaebacterial lipids, or any other group that increases the disorder of the chains and thereby the liquid-crystalline phase property of the SAM film. The advantage of the hydrocarbon chains that are found in naturally occurring archaebacterial lipids is that those lipids retain the liquid-crystalline phase over a large temperature range.

The length of the longest hydrocarbon chain in the group A 16 can vary from 3 to 60 carbons in length.

Figure 3:
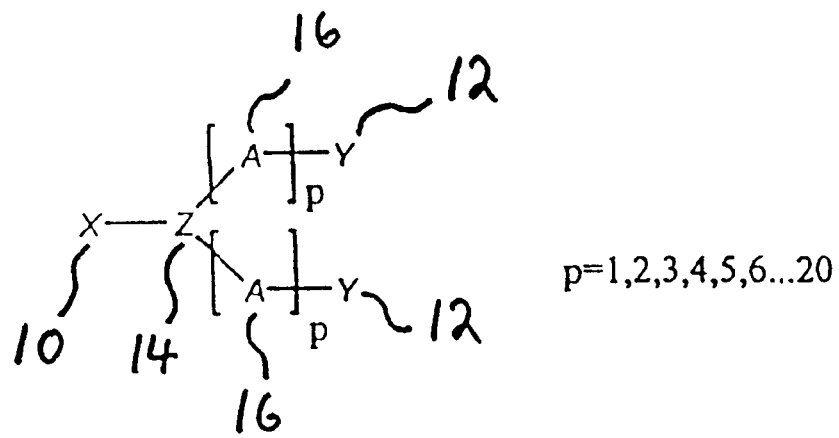
FIG. 3: is another generic formula of a molecule which forms a molecular layer which has a liquid-crystalline phase property.
Figure 4:
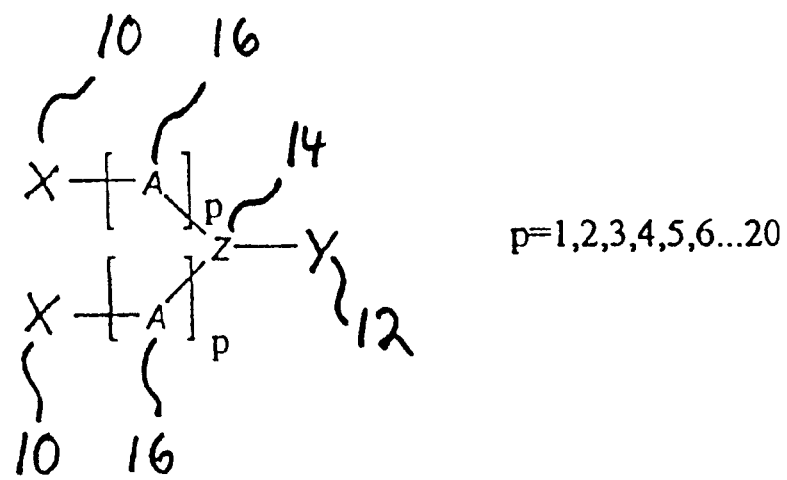
FIG. 4: is another generic formula of a molecule which forms a molecular layer which has a liquid-crystalline phase property.

Also, more than one group A 16 can be attached to the group Z 14 (as illustrated in FIGS. 3 and 4).

The advantage in using the classes of molecules described above for forming SAM which exhibit the liquid-crystalline phase property is that the positional disorder in this phase has the capacity to overcome substrate defects resulting in a coating of the substrate in which the substrate defects do not dominate in determining structural defects of the SAM.

Figure 5:
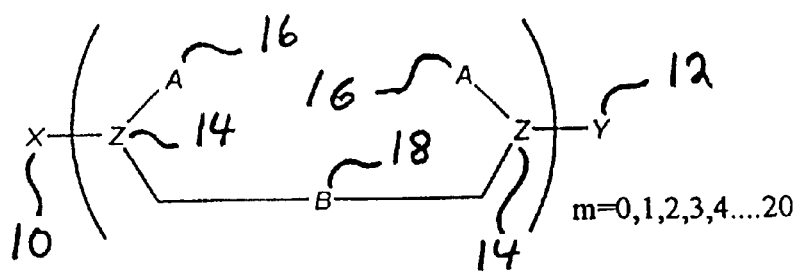
FIG. 5: is another generic formula of a molecule which forms a molecular layer which has a liquid-crystalline phase property.
Figure 6:
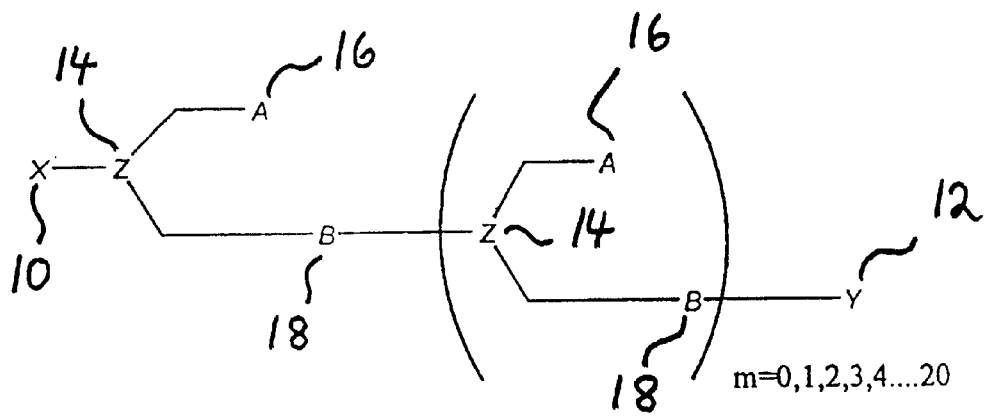
FIG. 6: is another generic formula of a molecule which forms a molecular layer which has a liquid-crystalline phase property.
Figure 7:
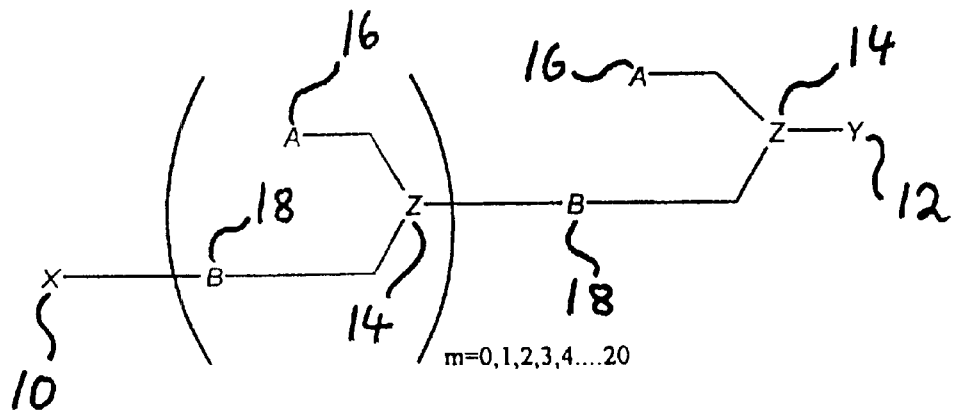
FIG. 7: is another generic formula of a molecule which forms a molecular layer which has a liquid-crystalline phase property.
Figure 8:
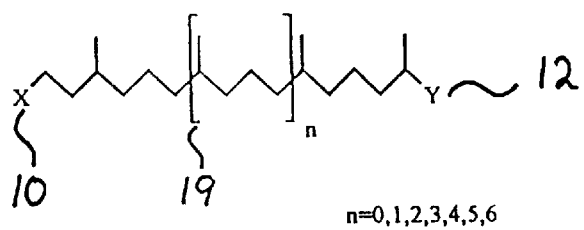
FIG. 8: is one molecule in accordance with an embodiment of the present invention.
Figure 9:
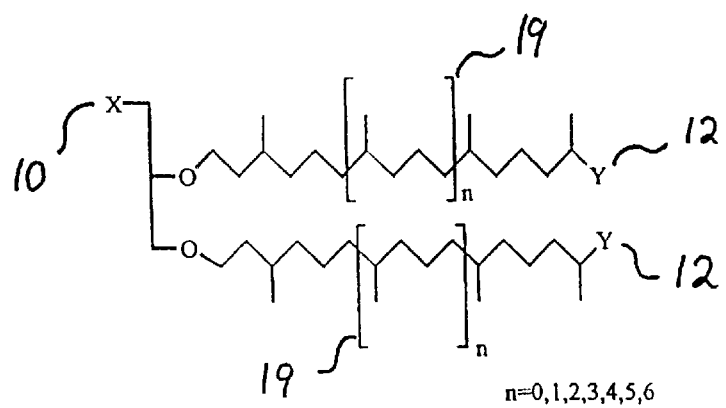
FIG. 9: is a molecule in accordance with another embodiment of the present invention.
Figure 10:
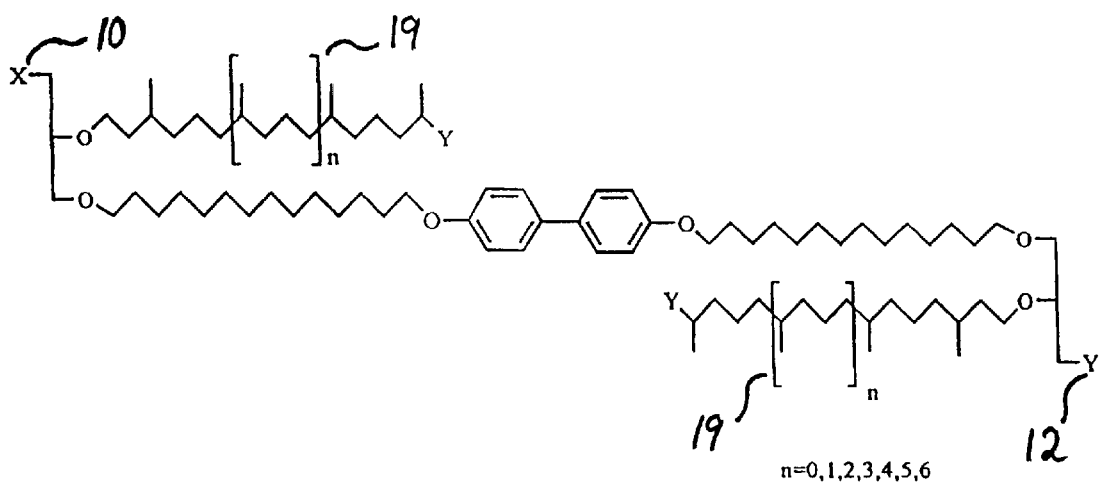
FIG. 10: is a molecule in accordance with another embodiment of the present invention.
Figure 11:
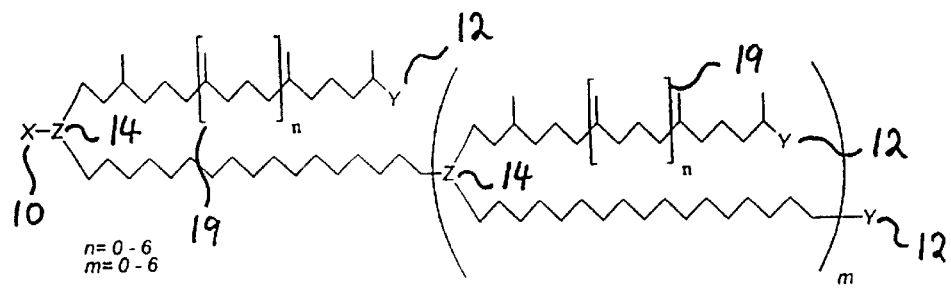
FIG. 11: is a molecule in accordance with another embodiment of the present invention.

In FIGS. 5 to 7 the generic structures of the SAM molecules further comprise a group B 18 which is used to attach one group Z 14 with another group Z 14 within the same molecule. The group B 18 can be a straight chain (linear) hydrocarbon, two linear hydrocarbons joined via an aromatic group (such as biphenol or 1,4-dibenzyl alcohol) or a heteroatom group (such as ether, amine, amide, sulfide), a phytanyl group or hydrocarbon derived from phytanol, a straight chain hydrocarbon that is mono or persubstituted with methyl groups, a straight chain hydrocarbon that incorporates five membered cyclic hydrocarbon structures, or it may be any of the group of hydrocarbon structures that are found in the hydrocarbon structures of naturally occurring archaebacterial lipids. The group B 18 can impart structural/stabilising characteristics into the SAM film by for example incorporating a rigid aromatic group such as biphenyl group into the molecule (see description of FIG. 9 below). The mixture of groups A and B chosen allows for flexibility of the tailoring of the liquid crystalline and structural properties/stability of the SAM depending on the application of the SAM on the substrate. It will be appreciated by a person skilled in the art that if group B 18 is a group which falls within the characteristics of group A 16 described above, the group B 18 can also contribute to the fluid phase properties of the SAM.

The length of the longest hydrocarbon chain in the group B 18 can vary from 3 to 60 carbons in length.

In FIGS. 8 to 13 there are shown more specific examples of the generic molecules shown in FIGS. 2 to 7.

In those Figures, group A is a phytanylgroup 19 which confers the liquid-crystalline phase property on to the molecules depicted in FIGS. 8 to 13.

Figure 12:
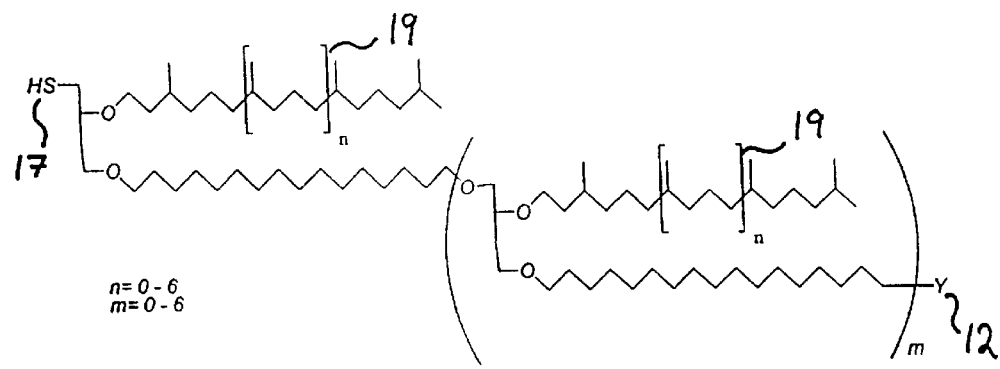
FIG. 12: is a molecule in accordance with another embodiment of the present invention.
Figure 13:
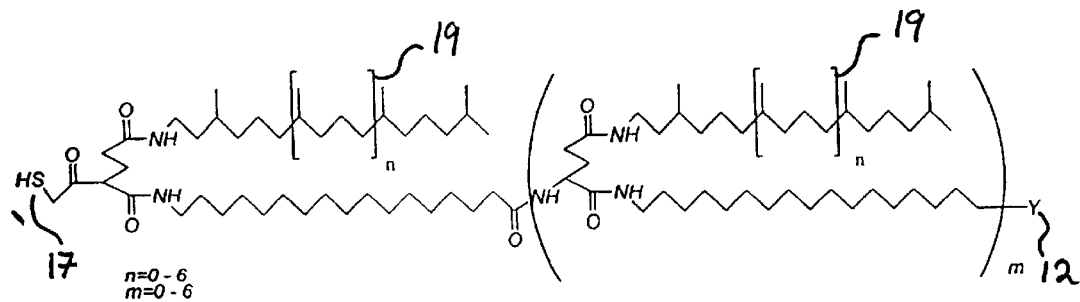
FIG. 13: is a molecule in accordance with another embodiment of the present invention.

In the embodiment of FIG. 12, group X is a SH group 17, whereas group Y 12 may be formed by an CH end portion of the outermost phytanyl group.

EXAMPLE 1

Formation of a phytanylthiol SAM which exhibits the fluid-crystalline phase property on GaAs.

A polished, single crystal N-type GaAs (100 wafer) is cleaned by immersion in 10% HCl in ethanol for 5 minutes, rinsed with ethanol and dichloromethane. The wafer is subsequently immersed in phytanylthiol and heated at 150° C. for 8 hours. After removal of the wafer from the phytanylthiol it is rinsed with dichloromethane several times to leave the GaAs wafer coated with a monolayer of phytanylthiol.

Figure 14:
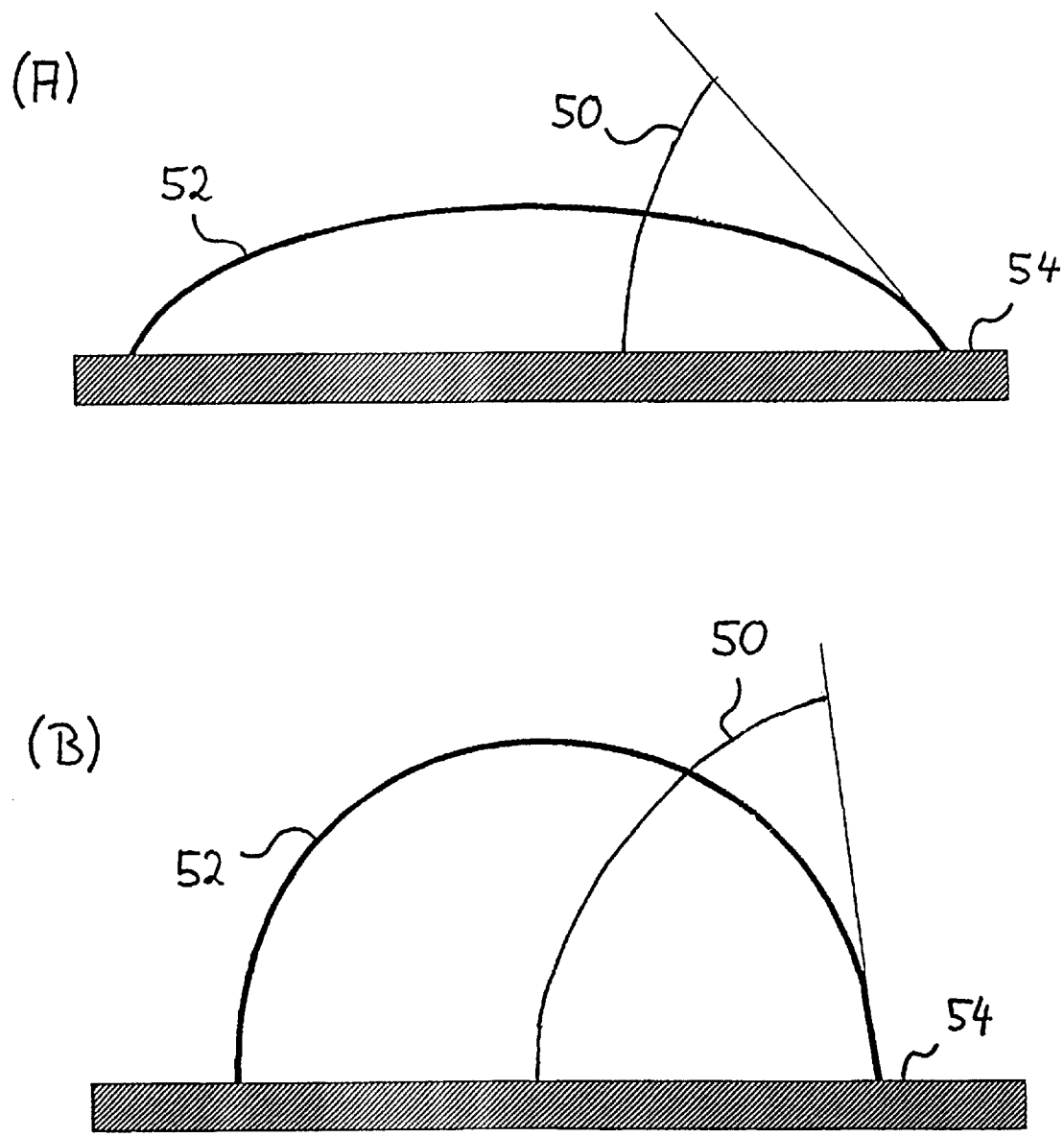
FIGS. 14A and B: are drawings illustrating contact angle measurements used to characterise embodiments of the present invention.

One experimental technique used to characterise the deposited SAMs is by performing contact angle measurements (static drop). In FIGS. 14A and 14B it is illustrated how the contact angle 50 of a static water drop 52 changes depending on whether the substrate 54 is hydrophilic or hydrophobic. For hydrophilic substrates, a small contact angle is measured, i.e. the water drop 52 "spreads out" over the substrate 54 (see FIG. 14A) whereas for a hydrophobic substrate a large contact angle is measured (see FIG. 14B).

Figure 15:
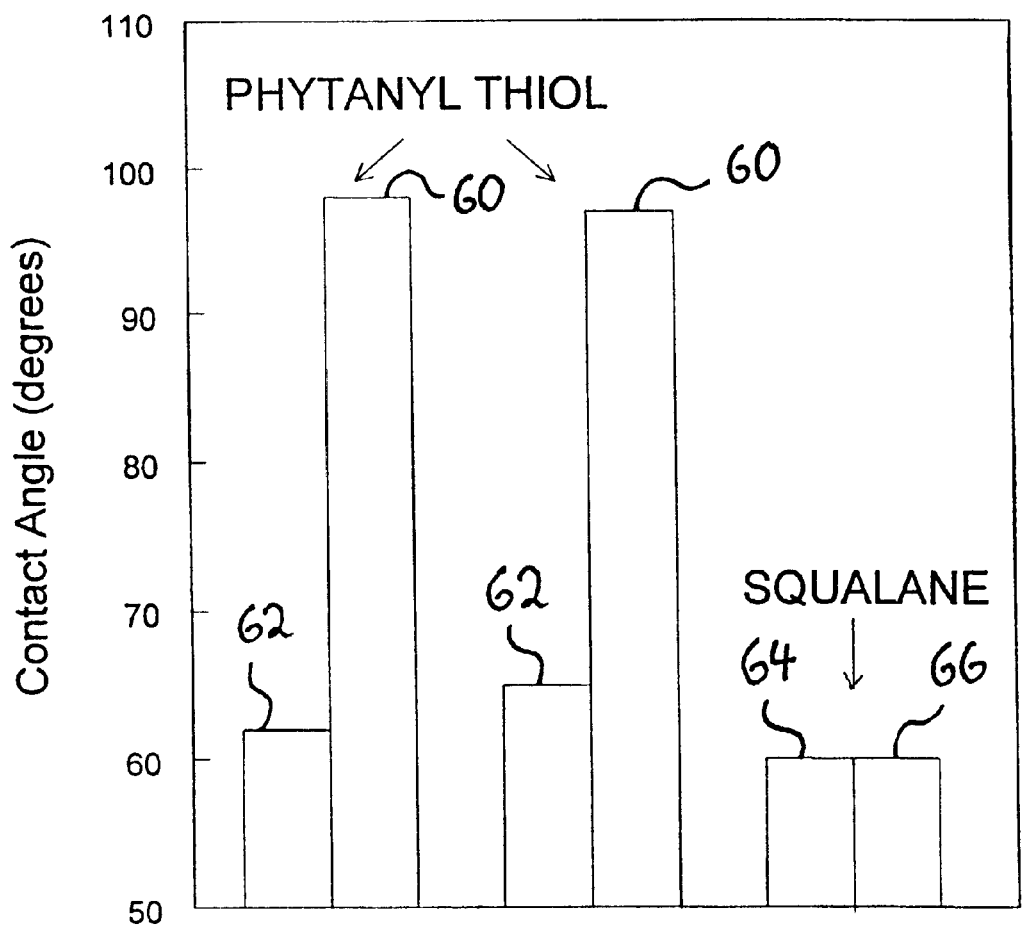
FIG. 15: is a diagram showing the measured contact angle for a substrate with and without a coating in accordance with an embodiment of the present invention and another coating.

As shown in FIG. 15, prior to formation of the phytanylthiol SAM the contact angle 62 of the GaAs wafer (after the initial etching described above) was typically of the order of 62 degrees. After phytanylthiol SAM formation, the contact angle 60 measured increased to typically 95 to 98 degrees. Also show in FIG. 15 are results of reference measurements which were performed on the GaAs wafer where it had been immersed (after the initial cleaning) in squalane at 150° C. for 8 hours. Squalane is identical to phytanylthiol but does not contain any thiol groups. As evident from FIG. 15, the contact angle measured did not change before 64 and after 66 the immersion in squalane and subsequent annealing. This result can be taken as an indication that the significant change obtained for the phytanylthiol treatment is due to the phytanylthiol molecule rather than the overall treatment conditions.

EXAMPLE 2

As an alternative embodiment of the present invention, the formation of a SAM exhibiting the fluid-crystalline phase property, the formation of a phytanyl SAM on GaAs using phytanylbromide is described.

Figure 16:
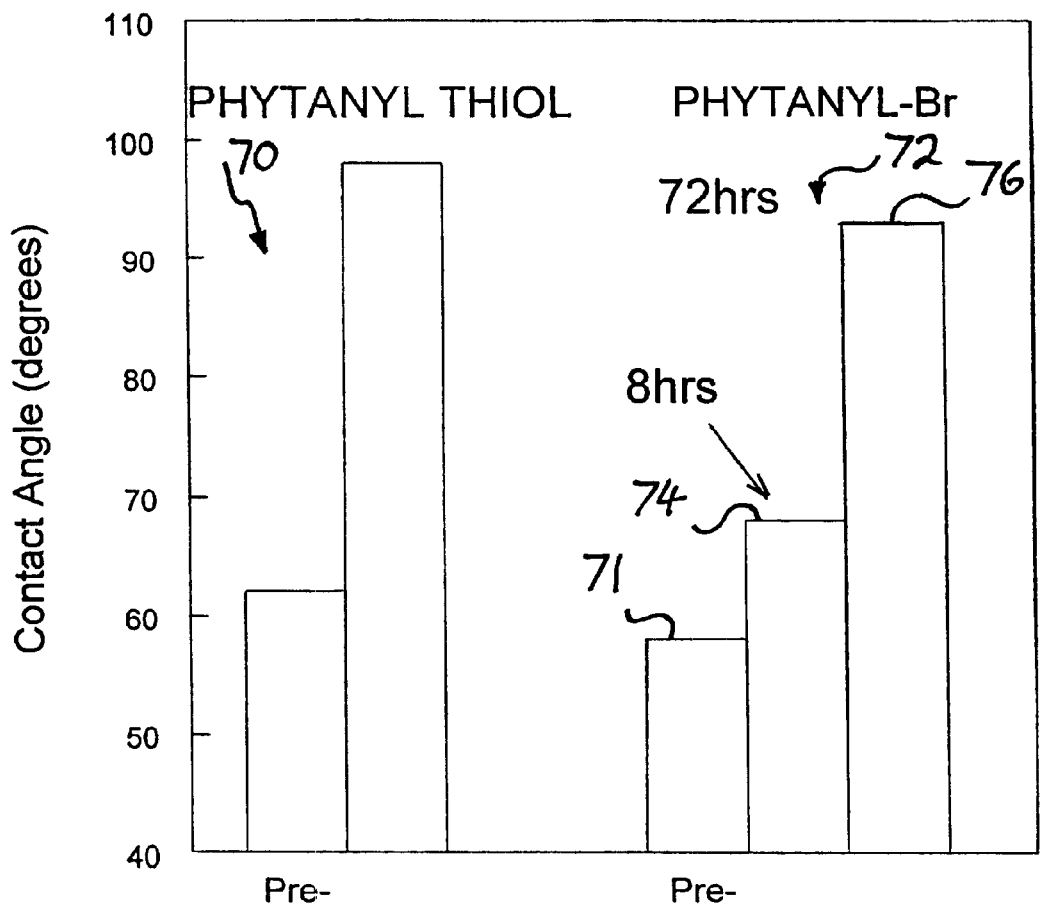
FIG. 16: is a diagram showing the contact angle measured for coatings in accordance with two embodiments of the present invention.

The initial cleaning of the N-type GaAs (100) wafer was identical to the one described in example 1. Subsequently, the wafer was immersed in phytanylbromide and heated at 150° C. In FIG. 16 the results for the SAMs formed from phytanylthiol 70 and phytanylbromide 72 are compared. Two different heating cycles are compared for the phytanylbromide solution, 8 hours at 150° C. and 72 hours at 150° C. After annealing for 8 hours, the contact angle 74 measured increased to about 70 degrees, whereas after annealing for 72 hours the contact angle further increased to about 95 degrees when compared with the clean substrate 71). As such, it is possible to prepare a SAM from the phytanylbromide solution which results in a contact angle similar to the one measured for phytanylthiol described in example 1.

Figure 17:
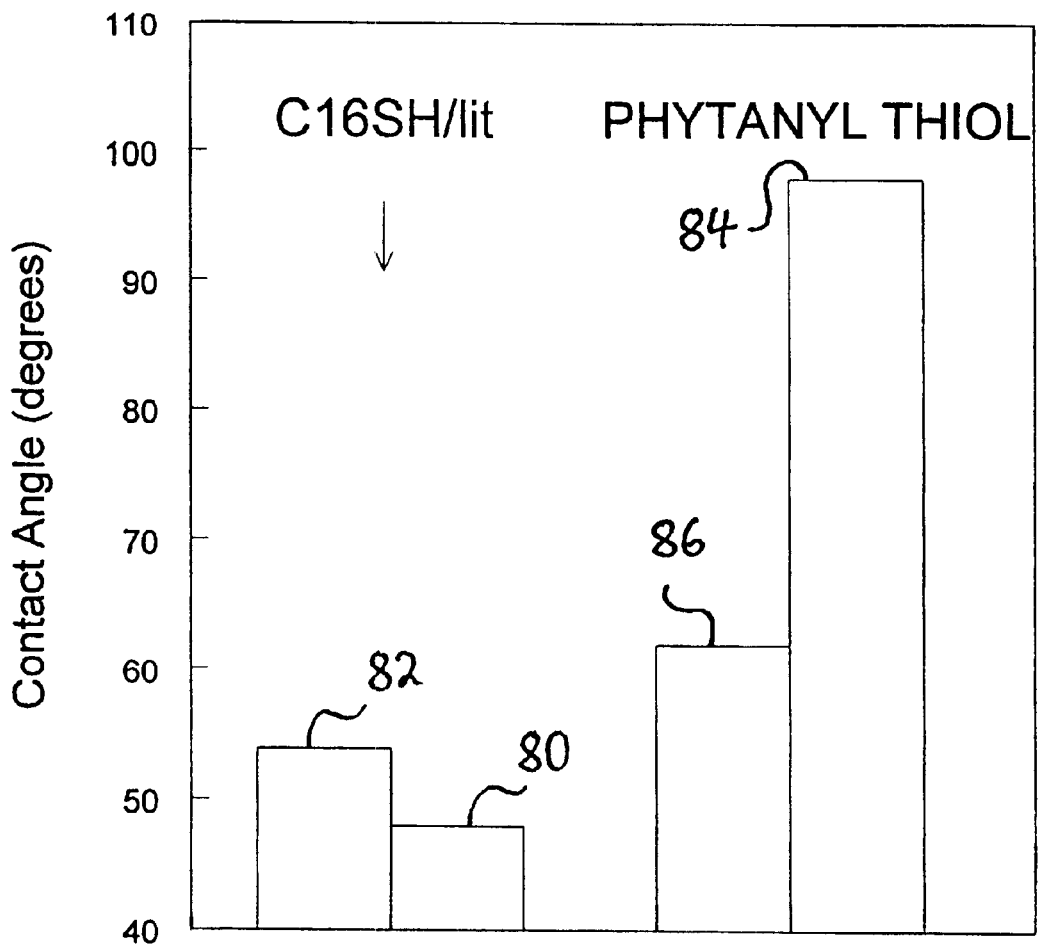
FIG. 17: is a diagram illustrating the contact angle measured for a coating in accordance with an embodiment of the present invention compared to another coating.

In FIG. 17, a comparison is shown between the phytanylthiol SAM exhibiting the fluid-crystalline phase property and a hexadecanethiol ($C_{16}H_{33}SH$ or (short) $C_{16}SH$) SAM which does not exhibit the fluid-crystalline phase property. Both SAM's were formed on GaAs surfaces cleaned as described under example 1 and were deposited also as described under examples 1 and 2.

For the $C_{16}SH$ SAM the contact angle slightly decreases 80 when compared with the cleaned, uncoated GaAs surface (82,86) whereas for the phytanylthiol SAM coated surface the contact angle increases 84 (compare also example 1) to a value of about 98 degrees.

Figure 18:
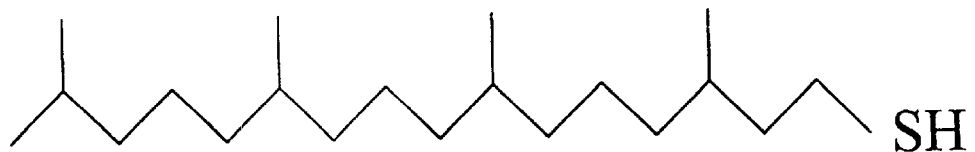
FIGS. 18A and B: are drawings of the molecules used in the coating in accordance with the embodiment of the present invention and in the other coating of FIG. 17, respectively.
Figure 18:

In FIGS. 18A and 18B the structure of both the phytanylthiol and the $C_{16}SH$ molecules, 90 and 92 respectively) are shown for comparison as examples of molecules for SAM's having the fluid-crystalline phase property and a crystalline property respectively.

EXAMPLE 3

As a further alternative embodiment of the present invention, passivation of gold surfaces will now be described. A comparison will be given between the corrosion passivation of gold surfaces by a phytanylthiol SAM in accordance with one embodiment of the present invention, and passivation of gold surfaces by a $C_{16}SH$ SAM, i.e. a molecule not exhibiting the fluid-crystalline phase property.

Corrosion passivation of gold surfaces can be investigated using Cyclic Voltammetry (CV).

CV during the electrochemical corrosion of a gold (Au) electrode in a solution of 0.1M $HClO_4$/0.01M KBr versus a Ag/AgCl reference electrode was performed. For details of the CV technique to investigate the ability of SAMs to block corrosion reference is made to RM Crooks et al, *Langmuir*, 1998, 14, 3279–3286.

During each CV scan the gold surface is corroded (i.e. gold dissolves) at defect sites of the SAM. Therefore, the more defect sites there are present in the SAM, the more gold is exposed and the larger is a current measured during the CV due to a larger amount of gold dissolved in the solution.

With "scan" the increase and decrease of a voltage applied to the gold surface is referred to.

Figure 19:
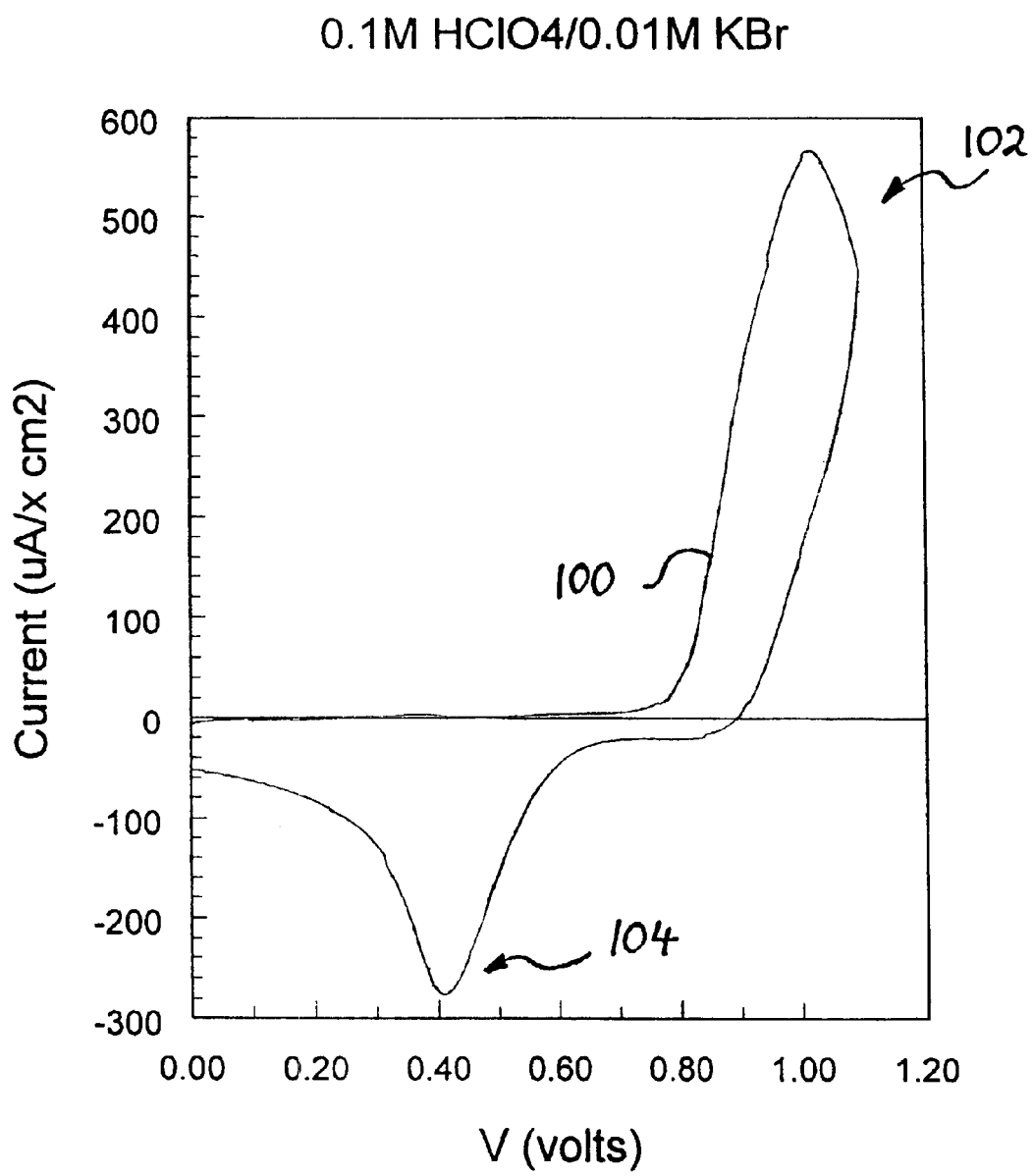
FIG. 19 shows a cyclic voltammetry curve of an uncoated gold electrode.

Turning now to FIG. 19, a CV of an uncoated gold electrode in the before mentioned solution is shown between 0.0 and 1.1 V (scan rate 50 mV/s).

In the curve 100 of FIG. 19, the anodic peak 102 between about 0.7–1.1 V is due to a gold dissolution reaction:

$$AuBr_2^- + e <= Au + 2Br^- (E°) \quad (1)$$

A cathodic peak 104 at about 0.4 V is due to gold redeposition.

Figure 20:
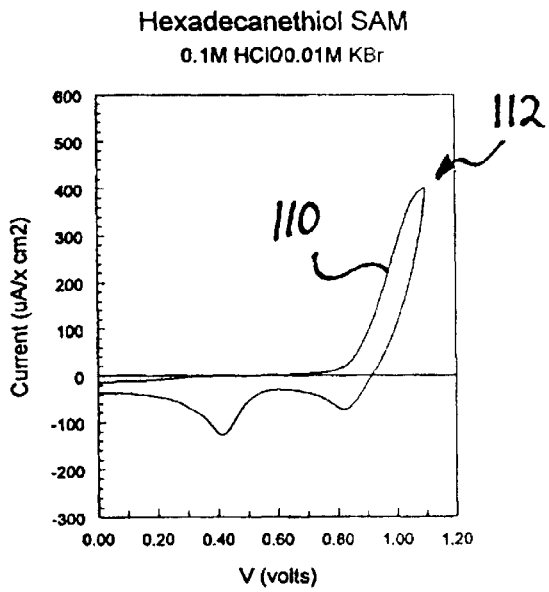
FIG. 20 shows a cyclic voltammetry curve of a gold electrode coated with hexadecanethiol SAM.

In FIG. 20, a CV curve 110 measured for a gold electrode coated with a $C_{16}SH$ SAM is shown after five scans.

Figure 21:
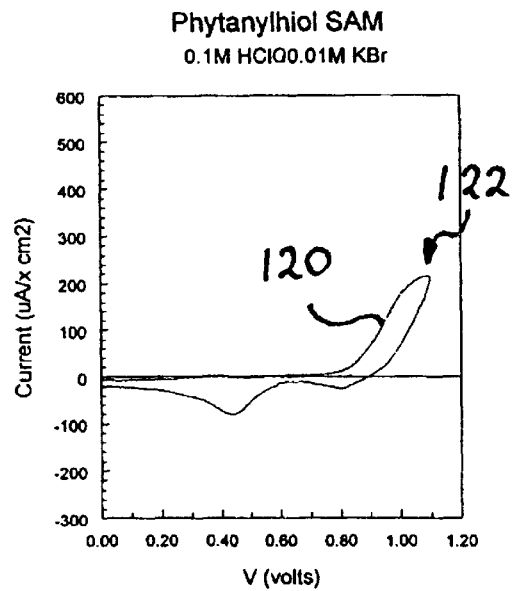
FIG. 21 shows a cyclic voltammetry curve of a gold electrode coated with phytanylthiol SAM in accordance with an embodiment of the present invention.

For comparison, FIG. 21 shows a CV curve 120 after five scans measured for a gold electrode coated with phytanylthiol.

As evident from a comparison between FIGS. 19, 20 and 21, the anodic peaks 112, 122 in FIGS. 20 and 21 are lower than the anodic peak 102 for an uncoated gold surface. More importantly, however, the anodic peak 122 measured for the phytanylthiol SAM coated gold surface is significantly lower than the anodic peak 112 measured for the $C_{16}SH$ SAM coated gold surface.

This result is an indication that the number of defect sites within the respective SAMs is smaller for the phytanylthiol SAM when compared with the $C_{16}SH$ SAM.

Figure 22:
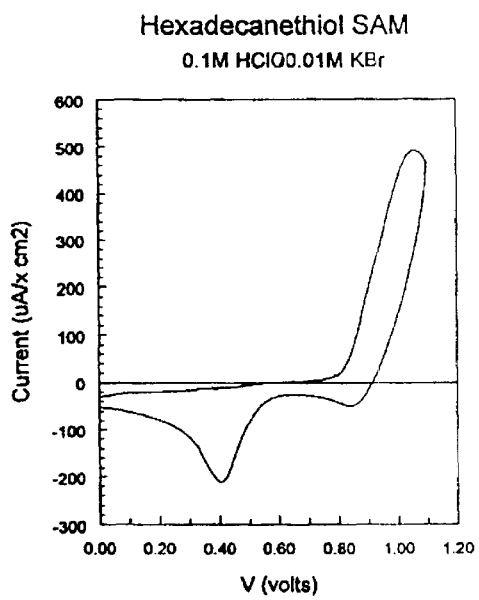
FIG. 22 shows acyclic voltammetry curve of a gold electrode coated with hexadecanethiol SAM.
Figure 23:
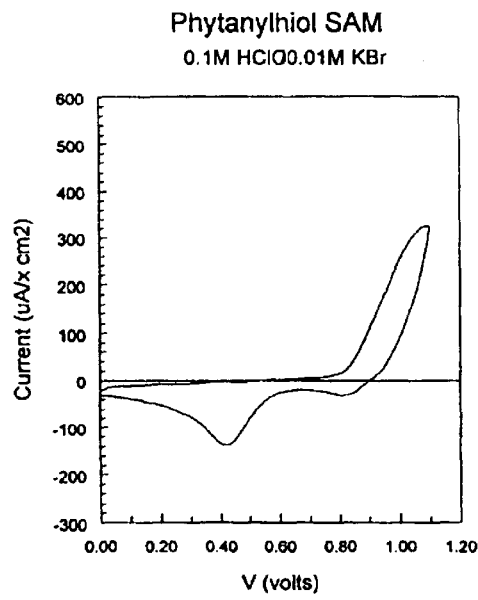
FIG. 23 shows a cyclic voltammetry curve of a gold electrode coated with phytanylthiol SAM in accordance with an embodiment of the present invention.

As illustrated in FIGS. 22 and 23, the same trend can be observed after ten scans, i.e. after continuing "corrosion" of the gold surface during the CV measurements.

Figure 24:
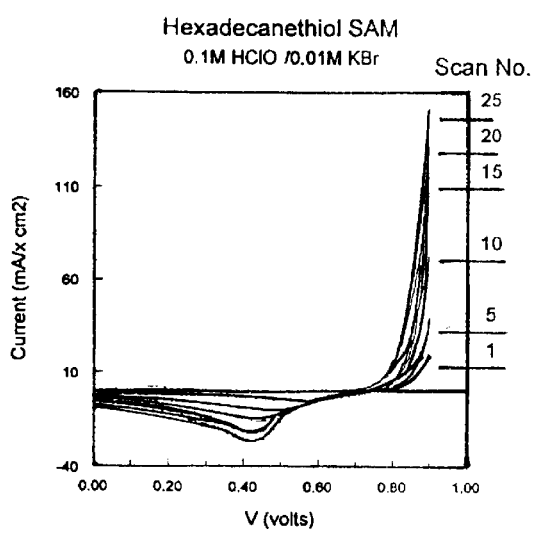
FIG. 24 shows cyclic voltammetry curves of a gold electrode coated with a hexadecanethiol SAM.
Figure 25:
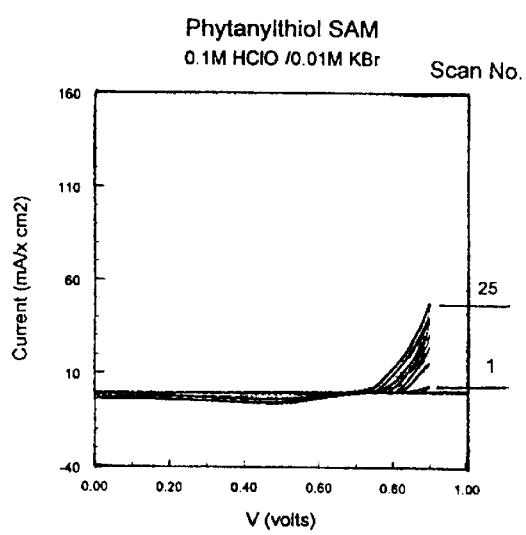
FIG. 25 shows cyclic voltammetry curves of a gold electrode coated with a phytanylthiol SAM in accordance with an embodiment of the present invention.

The electrochemical etching conditions during the CV measurements are relative harsh. Using a lower voltage amplitude for the scans of 0.9 V, the electrochemical etching of the SAMs is reduced. As illustrated in FIGS. 24 and 25, the difference between the $C_{16}SH$ SAM coated gold surface and the phytanylthiol SAM coated gold surface in terms of their corrosion characteristics can be seen even more clearly und those conditions.

Firstly, the overall rate of electrochemical corrosion is reduced, resulting in overall lower anodic peaks in FIGS. 24 and 25.

Importantly, however, the rate at which the $C_{16}SH$ SAM (FIG. 24) is electrochemically removed is significantly raster compared to the rate at which the phytanylthiol SAM (FIG. 25) is removed. In FIGS. 24 and 25, the respective scan numbers are indicated for respective curves.

Figure 26:
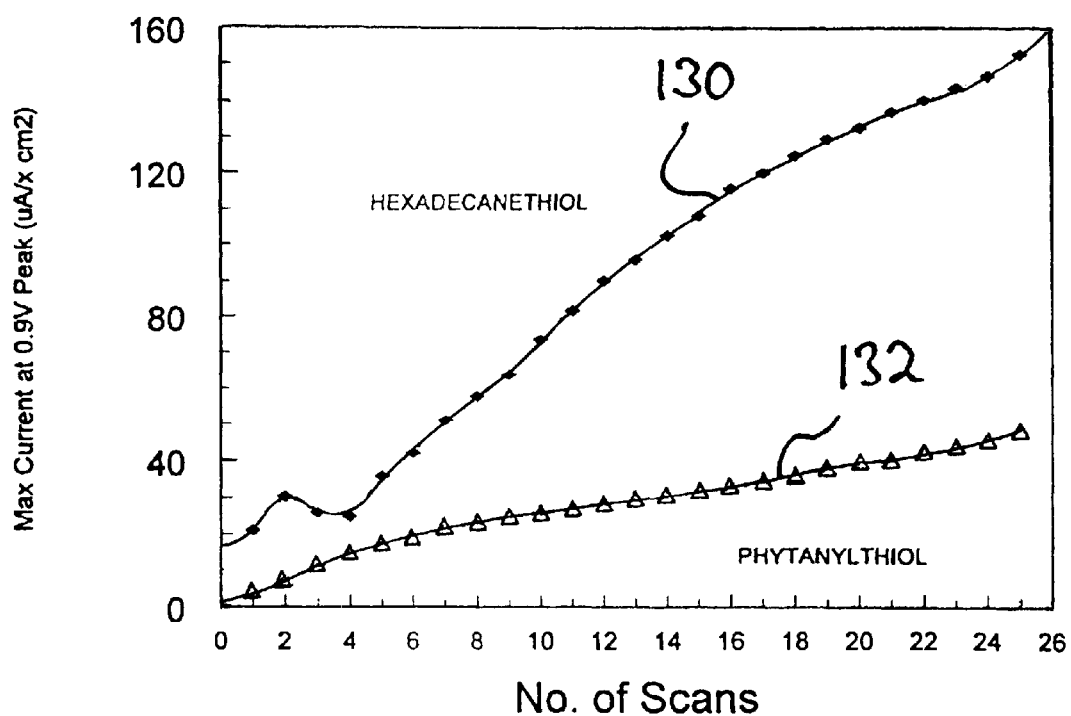
FIG. 26 shows the maximum currents at 0.9V in the curves of FIGS. 24 and 25 as a function of the number of scans.

In FIG. 26, the maximum current at 0.9 V measured for the $C_{16}SH_3$ coated gold surface and the phytanylthiol coated gold surface are shown as a function of the number of scans in curves 130, and 132 respectively. The significantly slower increase in the maximum current at 0.9 V during the CV measurements for the phytanylthiol SAM coated gold electrode (curve 132) is again indicative of a reduced rate of etching of the phytanylthiol SAM having the liquid-crystalline phase property, i.e. the significantly lower number of defect sites in the phytanylthiol SAM. Fewer defect sites in the phytanylthiol SAM result in less sites where gold is exposed to the before mentioned etching solution. The presence of fewer defects in the phytanylthiol SAM may be a result of an inherent increased stability of the phytanylthiol SAM against the electrochemical etching and/or a result of a better "self-healing" ability of the phytanylthiol SAM.

EXAMPLE 4

A further type of substrate protective coating utilising the fluid-crystalline phase property of the SAM in accordance with the present invention can be designed for applications where protection of the substrate is required but, for example, electrical insulation is not desirable. In examples 1 and 2 the phytanylthiol and phytanylbromide SAM's are characterised in that they electrically insulate the substrate. As such, those molecules are unsuitable where electrodes have to be coated.

In accordance with another embodiment of the present invention electrodes can be coated with SAMs which have the fluid-crystalline phase property where the A or B groups (see FIGS. 2 to 7) are hydrophilic and form hydrogen or ionic bonding networks. They provide the bonding network required between the molecules of the SAM to protect the surface from instability or contamination during storage but still allow the passage of ions along the hydrogen or ionic bonding network which are critical for the function of the electrode. In one preferred embodiment, the A or E groups may be chosen from polyethylene glycols. However, the A or B groups may be chosen from other hydrophilic groups such as polypropylene glycols or analogues, peptides, polypeptides, polysaccharides, charged groups, or electrically conducting compounds.

Those skilled in the art will recognise that the beneficial properties of these liquid crystalline SAM's can be incorporated into existing SAM's and existing applications of SAM's as well as novel applications.

Applications

The invention described hereinbefore has several applications examples of which will now be discussed.

One application is the protective coating of fabric to make the fabric hydrophobic, i.e. water resistant. Fabrics coated with a molecular layer having a liquid-crystalline phase property can be used for the production of water resistant clothing, for example for raincoats.

In another application, an insulating coating having the liquid-crystalline phase property on a semiconductor device such as a Schottky diode can be utilised to minimise the influence of electronic interactions at the semiconductor to air/ambient interface on the device performance.

In another application, a glass window coated with a hydrophobic molecular layer having the liquid-crystalline phase property can be used for example in cars to avoid adhesion of water droplets to the glass window.

In another application, high temperature super conductors or magnetic materials coated with a molecular layer having the liquid-crystalline phase property can be protected against water corrosion.

In another application, a molecular layer having the liquid-crystalline phase property can be used as a resist in for example the fabrication of electronic device structures.

In another application, a molecular coating having the liquid-crystalline phase property can be used to control properties of subsequently deposited thin films for example during the fabrication of multi-layered thin film device structures.

In the claims that follow and in the summary of the invention, except where the context requires otherwise due to express language or necessary implication, the word "comprising" is used in the sense of "including", i.e. the features specified may be associated with further features in various embodiments of the invention.

The claims defining the invention are as follows:

1. A method of ionically and/or electrically insulating a surface of a material, the method comprising attaching to the surface a self-assembling monolayer membrane, the membrane comprising self-assembling molecules that comprise hydrocarbon chains having a length of 3 to 60 carbons, the self-assembling molecules being selected such that the membrane is liquid crystalline.

2. A method as claimed in claim 1 in which at least a plurality of the self-assembling molecules are provided with groups which attach a membrane to the surface.

3. A method as claimed in claim 2 in which the groups are thiol groups.

4. A method as claimed in any one of claims 1–3 in which the material is GaAs.

5. A method as claimed in claim 1 in which the self-assembling molecules comprise phytanylthiol.

6. A method as claimed in claim 2 in which the self-assembling molecules comprise phytanylthiol.

7. A method as claimed in claim 3 in which the self-assembling molecules comprise phytanylthiol.

8. A method as claimed in claim 4 in which the self-assembling molecules comprise phytanylthiol.

* * * * *